US011948486B2

(12) United States Patent
Ryu et al.

(10) Patent No.: US 11,948,486 B2
(45) Date of Patent: Apr. 2, 2024

(54) INTEGRATED CIRCUIT HAVING UNIVERSAL ASYNCHRONOUS RECEIVER/TRANSMITTER FOR DATA COMMUNICATION STABILITY IN NOISE ENVIRONMENT

(71) Applicant: FINDEACHIP Inc., Cheongju-si (KR)

(72) Inventors: Dong Yeol Ryu, Cheongju-si (KR); Kwang Hyun Ryoo, Cheongju-si (KR); Yeon Hun Choi, Cheongju-si (KR)

(73) Assignee: FINDEACHIP Inc., Cheongju-si (KR)

( * ) Notice: Subject to any disclaimer, the term of this patent is extended or adjusted under 35 U.S.C. 154(b) by 0 days.

(21) Appl. No.: 17/974,544

(22) Filed: Oct. 27, 2022

(65) Prior Publication Data
US 2023/0215313 A1 Jul. 6, 2023

Related U.S. Application Data

(63) Continuation of application No. PCT/KR2022/005005, filed on Apr. 7, 2022.

(30) Foreign Application Priority Data

Jan. 4, 2022 (KR) .................. 10-2022-0000758

(51) Int. Cl.
*G09G 3/14* (2006.01)
*G06F 3/02* (2006.01)
(Continued)

(52) U.S. Cl.
CPC ............. *G09G 3/14* (2013.01); *G06F 3/02* (2013.01); *G06F 3/0362* (2013.01); *G06F 3/038* (2013.01);
(Continued)

(58) Field of Classification Search
CPC ..................................................... G09G 3/14
(Continued)

(56) References Cited

U.S. PATENT DOCUMENTS

| 2009/0093229 A1* | 4/2009 | Grunow | H04M 1/72424 |
| | | | 345/173 |
| 2009/0322725 A1* | 12/2009 | David | G09G 3/18 |
| | | | 345/211 |

(Continued)

FOREIGN PATENT DOCUMENTS

| KR | 10-1183778 B1 | 9/2012 |
| KR | 10-2016-0140847 A | 12/2016 |

(Continued)

OTHER PUBLICATIONS

International Search Report for PCT/KR2022/005005 dated Sep. 7, 2022 from Korean Intellectual Property Office.

*Primary Examiner* — Long D Pham
(74) *Attorney, Agent, or Firm* — Revolution IP, PLLC

(57) ABSTRACT

An integrated circuit with data communication stability in a noise environment includes at least one input section through which a signal is input from a user, at least one output section through which information is output in a predetermined form, and a microcontroller unit (MCU), independently of the microcontroller unit (MCU), and communicates with the microcontroller unit to control, on the basis of the input signal generated from the at least one input section, output driving of the output section corresponding thereto, the integrated circuit including: a serial interface that includes an Rx pin for receiving a data signal from the microcontroller unit by forming a signal reception line with respect to the microcontroller unit and a Tx pin for transmitting a data signal to the microcontroller unit by forming a signal transmission line with respect to the microcontroller unit.

9 Claims, 6 Drawing Sheets

(51) Int. Cl.
*G06F 3/0362* (2013.01)
*G06F 3/038* (2013.01)
*G06F 13/42* (2006.01)

(52) U.S. Cl.
CPC ..... *G06F 13/4282* (2013.01); *G09G 2354/00* (2013.01); *G09G 2370/10* (2013.01)

(58) Field of Classification Search
USPC .......................................................... 345/184
See application file for complete search history.

(56) References Cited

U.S. PATENT DOCUMENTS

| | | |
|---|---|---|
| 2012/0030447 A1 | 2/2012 | Shingal et al. |
| 2014/0156872 A1 | 6/2014 | Buer et al. |
| 2016/0062623 A1* | 3/2016 | Howard ................ G06F 3/0488 715/788 |
| 2016/0135241 A1 | 5/2016 | Gujral et al. |
| 2018/0276516 A1 | 9/2018 | Ahn |

FOREIGN PATENT DOCUMENTS

| | | |
|---|---|---|
| KR | 10-2017-0027017 A | 3/2017 |
| KR | 10-1718080 B1 | 3/2017 |
| KR | 10-2213405 B1 | 2/2021 |

* cited by examiner

INTEGRATED CIRCUIT HAVING UNIVERSAL ASYNCHRONOUS RECEIVER/TRANSMITTER FOR DATA COMMUNICATION STABILITY IN NOISE ENVIRONMENT

TECHNICAL FIELD

The present invention relates to an integrated circuit with data communication stability in a noise environment.

BACKGROUND ART

A variety of home appliances is provided with an input section through which an input signal for driving a specific operation of the device is generated from a user, an output section through which corresponding specific information based on the input signal generated through the input section from the user is output to the user, and a microcontroller unit (MCU) for controlling a series of processes including detection of the input signal and generation and output of the output signal.

That is, according to development of levels and types of functions necessary for technological advancements, an increasing functional load has been applied to the microcontroller unit (MCU) that controls operating states of the device so that various functions can be provided through the signal input and output.

Accordingly, various attempts have been made to distribute workload of the microcontroller unit. In this regard, in order to provide output driving related dedicated hardware that distributes the workload related to output of visual information on a display through LED emission and output of auditory information through a buzzer sound, independently of the microcontroller unit, the applicant has proposed the Republic of Korea Patent No. 10-2213405 "USER INPUT/OUTPUT INTERFACE INTEGRATED CIRCUIT" (hereinafter, referred to as a "related art").

Through the above related art, the applicant has proposed an integrated circuit that distributes the workload through a microcontroller unit (MCU) in controlling output driving in cooperation with an input section and an output section provided in a home appliance.

In this regard, in order to further improve the technique of the above related art, the applicant proposes herein a technique for eliminating, through a technical change in a signal communication system built by an integrated circuit that cooperates with a microcontroller unit (MCU) in control of operations of an input section and an output section provided independently of the microcontroller unit (MCU), the need for software processing additionally necessary for distinction between a transmitted signal and a received signal in signal communication and correspondence between a baud rate in transmission and a baud rate in reception.

In addition, the applicant proposes a technique for improving stability and reliability of the signal communication by easily detecting an error in the signal communication between the microcontroller unit (MCU) and the integrated circuit even in a noise environment.

DISCLOSURE

Technical Problem

The present invention has been made in view of the above-mentioned problems, and an object of the present invention is to provide a technique capable of providing output driving related dedicated hardware that distributes workload related to output of visual information on a display through LED emission and output of auditory information through a buzzer sound, independently of a microcontroller unit.

Further, another object of the present invention is to provide an integrated circuit having a communication protocol capable of eliminating the need for software processing additionally necessary for distinction between a transmitted signal and a received signal in signal communication and correspondence between a baud rate in transmission and a baud rate in reception, in building a communication network between a microcontroller unit and an integrated circuit.

In addition, still another object of the present invention is to provide an integrated circuit with improved stability and reliability in signal communication by easily detecting an error in signal communication between a microcontroller unit (MCU) and an integrated circuit even in a noise environment, in signal communication between the microcontroller unit and the integrated circuit.

Technical Solution

In order to achieve the above objects, according to an aspect of the present invention, there is provided an integrated circuit with data communication stability in a noise environment that is provided in a control target device that includes at least one input section through which a signal is input from a user, at least one output section through which information is output in a predetermined form, and a microcontroller unit (MCU), independently of the microcontroller unit (MCU), and communicates with the microcontroller unit to control, on the basis of the input signal generated from the at least one input section, output driving of the output section corresponding thereto, the integrated circuit including: a serial interface that includes an Rx pin for receiving a data signal from the microcontroller unit by forming a signal reception line with respect to the microcontroller unit and a Tx pin for transmitting a data signal to the microcontroller unit by forming a signal transmission line with respect to the microcontroller unit, to provide a universal asynchronous receiver/transmitter (UART) communication protocol with respect to the microcontroller unit; and a control logic that controls transmission of a second data signal including an analysis area corresponding to a plurality of consecutive bits indicating information obtained by analyzing a bit structure of a first data signal received from the microcontroller unit to the serial interface through the Rx pin, to the microcontroller unit from the serial interface through the Tx pin for feedback.

Here, the control logic includes a truesum feedback controller that performs an analysis for calculating a truesum indicating the number of bits having '1' among bits in a predetermined area of the first data signal received through the signal reception line from the microcontroller unit to the serial interface through the Rx pin, and controls the serial interface so that the second data signal including the analysis area indicating the calculated truesum result value can be fed back to the microcontroller unit.

Further, the first data signal according to a write-type communication protocol between the microcontroller unit and the serial interface includes: a first register addressing packet that includes a first start bit indicating the start of a signal, a first adjacent bit that follows the first start bit and indicates a value opposite to a value of the first start bit, a first type indication bit that follows the first adjacent bit and indicates that the first data signal is a write-type among a read-type and the write-type, a first command area that follows the first type indication bit and corresponds to a plurality of consecutive bits indicating register address information on a target register of the first data signal among registers of the integrated circuit, and a first stop bit that follows the first command area and indicates the stop of the signal; and a register data packet that includes a third start bit that follows the first stop bit of the first register addressing packet and indicates the start of a signal, a data area that follows the third start bit and corresponds to a plurality of consecutive bits indicating register data information to be provided to the target register, and a third stop bit that follows the data area and indicates the stop of the signal, and the truesum feedback controller performs an analysis for calculating the number of bits having '1' among the plurality of consecutive bits in the first command area of the first register addressing packet and the data area of the register data packet as the truesum result value.

In addition, the second data signal according to a write-type communication protocol between the microcontroller unit and the serial interface includes: a first feedback packet that includes a fourth start bit indicating the start of the signal, a first analysis area that follows the fourth start bit and corresponds to a plurality of consecutive bits indicating the information on the truesum result value calculated through the truesum feedback controller, and a fourth stop bit that follows the first analysis area and indicates the stop of the signal.

Further, the first data signal according to a read-type communication protocol between the microcontroller unit and the serial interface includes: a second register addressing packet that includes a second start bit indicating the start of a signal, a second adjacent bit that follows the second start bit and indicates a value opposite to a value of the second start bit, a second type indication bit that follows the second adjacent bit and indicates that the second data signal is a read-type among the read-type and a write-type, a second command area that follows the second type indication bit and corresponds to a plurality of consecutive bits indicating register address information on a target register of the second data signal among registers of the integrated circuit, and a second stop bit that follows the second command area and indicates the stop of the signal, and the truesum feedback controller performs an analysis for calculating the number of bits having '1' among the plurality of consecutive bits in the second command area of the second register addressing packet as the truesum result value.

Further, the second data signal according to a read-type communication protocol between the microcontroller unit and the serial interface includes: a read data packet that includes a fifth start bit indicating the start of a signal, a read data area that follows the fifth start bit and corresponds to a plurality of consecutive bits indicating read data information to be provided to the microcontroller unit, and a fifth stop bit that follows the read data area and indicates the stop of the signal; and a second feedback packet that includes a sixth start bit that follows the fifth stop bit of a signal of the read data packet and indicates the start of the signal, a second analysis area that follows the sixth start bit and corresponds to a plurality of consecutive bits indicating the information on the truesum result value calculated through the truesum feedback controller, and a sixth stop bit that follows the second analysis area and indicates the stop of the signal.

In addition, the integrated circuit with data communication stability in the noise environment further includes: at least one input information detector that is respectively connected to the at least one input section and detects an input signal generated by an input operation through the at least one input section from the user to detect input information on the detected input signal, and the input information detector includes: a first input information detector that is connected to a first input section that is provided in the control target device in the form of a key button, and detects an input signal generated by an input operation through the first input section from the user to detect first input information on the input signal detected by the first input section; and a second input information detector that is connected to a second input section that is provided in the control target device in the form of a knob connected to a rotary encoder, and detects an input signal generated by an input operation through the second input section from the user to detect second input information on the input signal detected by the second input section.

Here, the second input section generates an input signal in a structure in which the most significant bit (MSB) corresponds to a direction bit indicating a rotation direction of the rotary encoder, and a count area corresponding to a plurality of consecutive bits indicating information on a count value obtained by rotation of the rotary encoder in the rotation direction indicated by the most significant bit is disposed next to the most significant bit, and the second input information detector detects the rotation direction of the rotary encoder and second input information on the count value on the basis of the input signal generated by the second input section.

Further, the second input section initializes, in a case where the second input information detected through the second input information detector is transmitted to the microcontroller unit through the serial interface, the information about the count value obtained by rotation of the rotary encoder to '0'.

Advantageous Effects

The present invention provides the following effects.

First, it is possible to provide an integrated circuit as dedicated hardware capable of performing operations related to display driving and buzzer driving, independently of a microcontroller unit.

Second, it is possible to distribute workload related to display output of visual information through LED emission of the microcontroller unit and buzzer output of auditory information through a buzzer sound, to thereby improve work efficiency in various information processing such as output driving of the microcontroller unit and to prevent delay of other operations according to the output driving.

Third, it is possible to eliminate the need for software processing additionally necessary for distinction between a transmitted signal and a received signal in signal communication by providing a universal asynchronous receiver/transmitter (UART) communication protocol between a serial interface of the integrated circuit and the microcontroller unit.

Fourth, it is possible to perform a communication function at an optimal adaptive baud rate by variably matching a baud rate in transmission to a baud rate in reception through an adaptive baud rate controller of a control logic, together with the UART communication protocol between the serial interface of the integrated circuit and the microcontroller unit.

Fifth, it is possible to maximize detection ability of an error due to noise through a truesum feedback controller of the control logic and to improve stability and reliability in data signal communication, even in a noise environment, in signal communication between the serial interface of the integrated circuit and the microcontroller unit.

Sixth, as the second input section generates an input signal in a structure in which the most significant bit (MSB) corresponds to a direction bit indicating a rotation direction of a rotary encoder, and a count area corresponding to a plurality of consecutive bits indicating information on a count value obtained by rotation of the rotary encoder in a rotation direction indicated by the most significant bit is disposed next to the most significant bit, the second input information detector can detect the rotation direction of the rotary encoder and the count value on the basis of the input signal generated by the second input section.

Seventh, in a case where the second input section generates an input signal for detection of new second input information after the second input information is transmitted to the microcontroller unit, as information is determined again in a state where information on the rotation count value of the rotary encoder is initialized, it is possible to easily and accurately determine the information and to eliminate the need for an additional function due to overflow of information.

DETAILED DESCRIPTION

Preferred embodiments of the present invention will be described in detail with reference to the accompanying drawings, and known technical parts will be omitted or simplified for ease of description.

<Components and Operation Types of Integrated Circuit with Data Communication Stability in Noise Environment>

Figure 1:
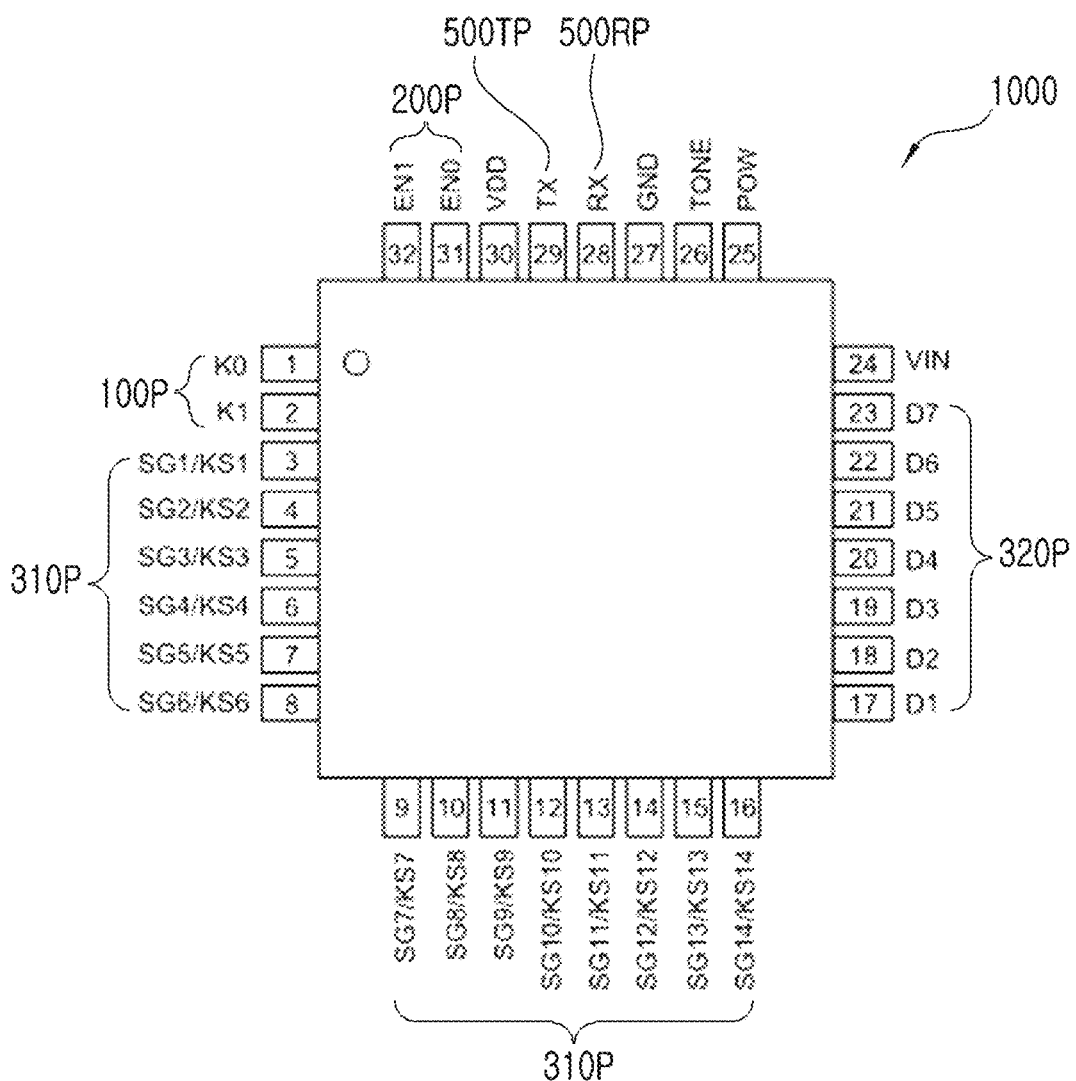
FIG. 1 is a diagram showing an external structure and a pin connection state of an integrated circuit according to an embodiment of the present invention.
Figure 2:
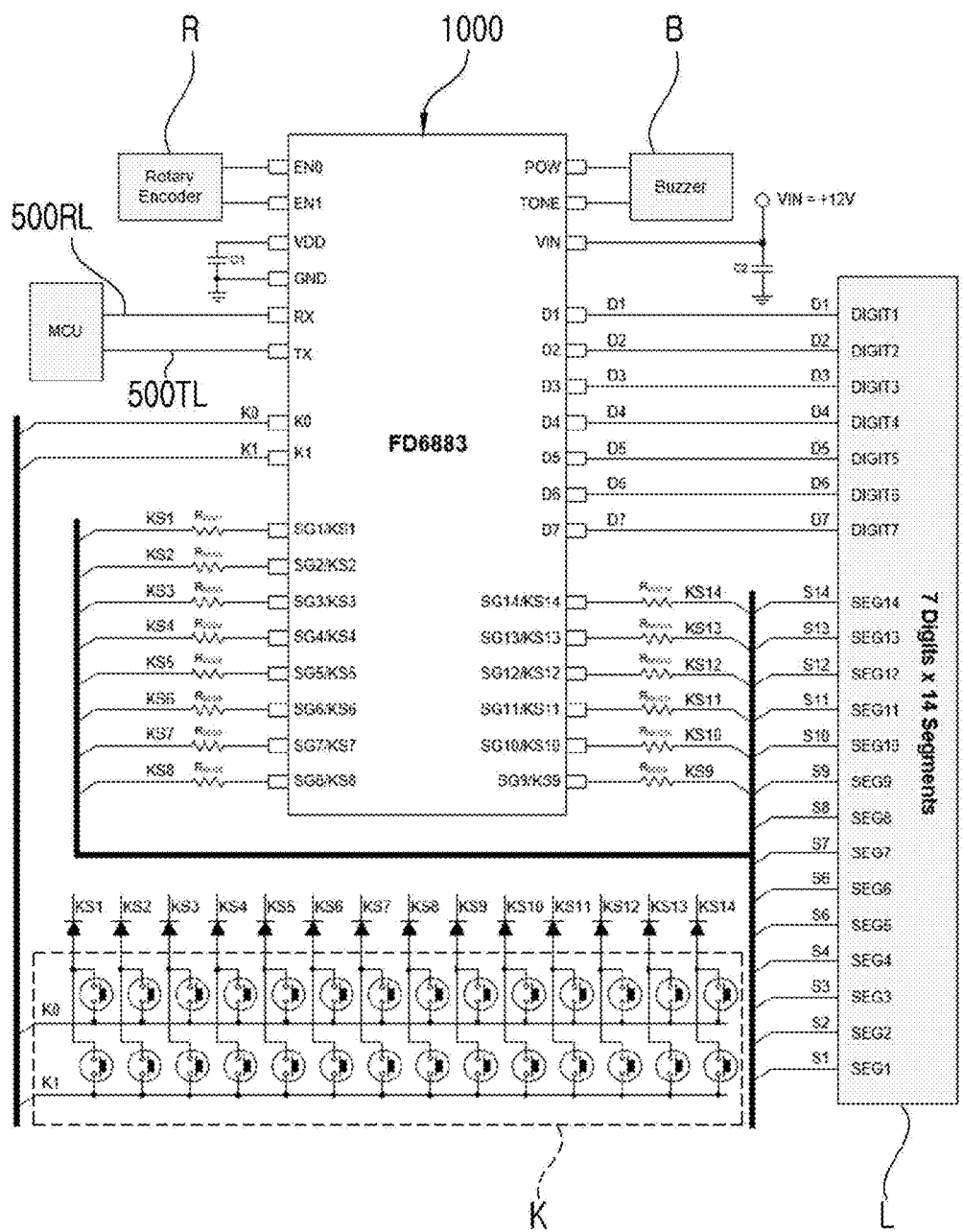
FIG. 2 is a circuit diagram showing a connection structure between the integrated circuit according to the embodiment of the present invention, an input section, an output section, and a microcontroller unit.
Figure 3:
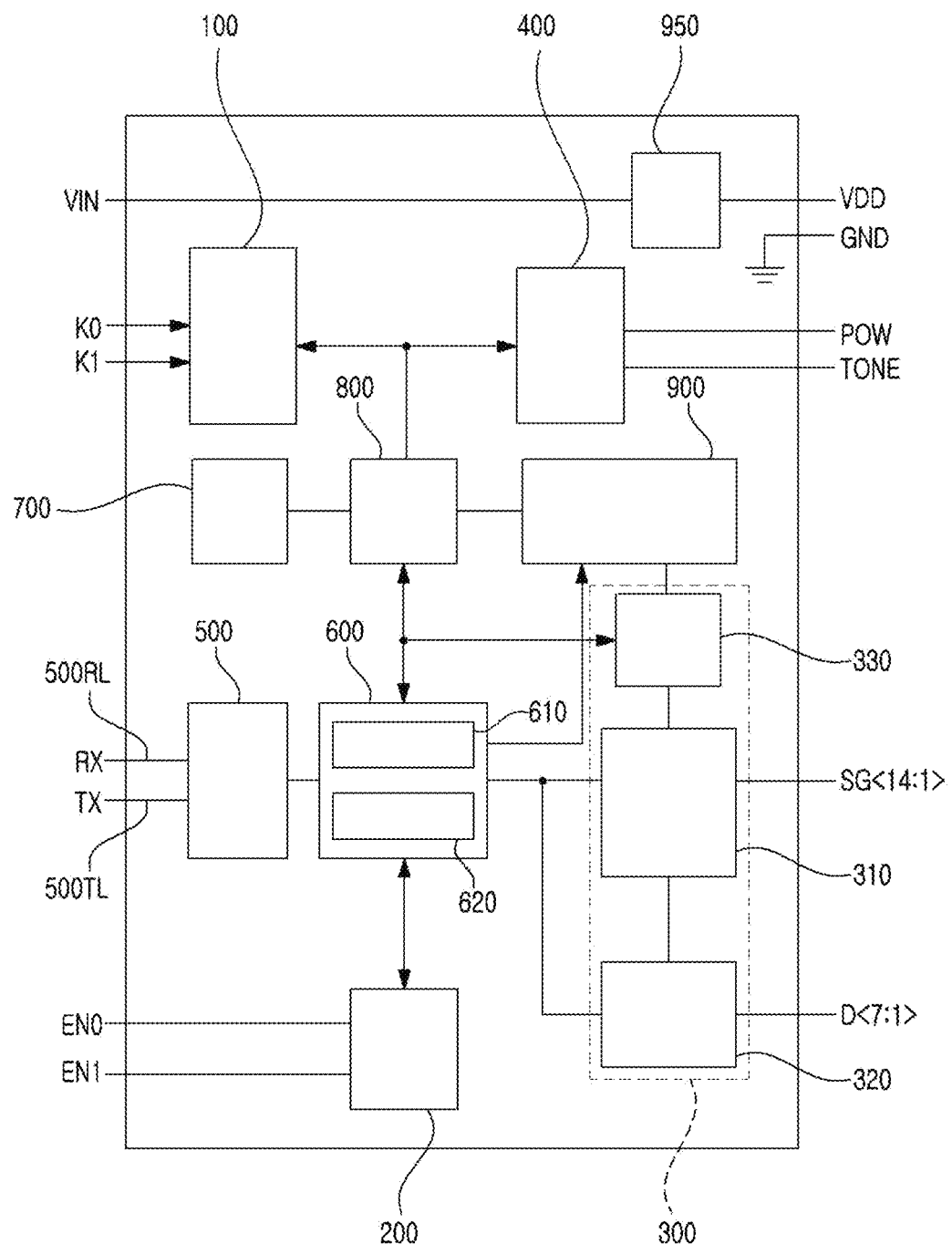
FIG. 3 is a block diagram showing a connection structure between components of the integrated circuit according to the embodiment of the present invention, and the input section, the output section, and the microcontroller unit.

According to an embodiment of the present invention, there is provided an integrated circuit (IC) 1000 that is provided in a control target device that includes at least one input section (K, R) through which a signal is input from a user, at least one output section (L, B) through which information is output in a predetermined form, and a microcontroller unit (MCU), independently of the microcontroller unit (MCU), to control output driving of the output section (L, B) corresponding thereto, on the basis of an input signal generated from the at least one input section (K, R), which will be described in detail with reference to FIGS. 1 to 3.

Here, the input section includes a first input section (K) that is provided in the form of a key button and a second input section (R) that is provided in the form of a knob connected to a rotary encoder.

Further, the output section includes a first output section (L) that is provided in the form of a display for outputting visual information through LED emission and a second output section (B) for outputting auditory information through a buzzer sound.

Here, the integrated circuit 1000 has an independent configuration for distributing the degree of load applied to operations of the microcontroller unit (MCU) in controlling operations of accessories such as various modules and sensors provided in the control target device to provide a distributed control function.

To this end, as shown in FIG. 3, the integrated circuit 1000 of the present embodiment includes a first input information detector 100, a second input information detector 200, a first output driver 300, a second output driver 400, a serial interface 500, a control logic 600, an oscillator 700, a timing information generator 800, and a RAM 900.

First, the user input/output interface integrated circuit 1000 according to the present embodiment has an external pin configuration as shown in FIG. 1 for connection with external devices or components and establishment of a communication network in operation of the components described above.

The first input information detector 100 is connected to the first input section (K), and detects an input signal generated by an input operation through the first input section from a user to detect first input information on the input signal detected by the first input section (K).

Here, the first input information detector 100 has, unlike a conventional microcontroller unit (MCU) for detecting an input signal generated from a first input section (K) such as a key button in a software manner, detecting information on the basis of the input signal, and storing the detected signal and the detected information, a hardware configuration separated from the microcontroller unit (MCU) and capable of independently performing the corresponding functions.

Specifically, the first input information detector 100 may be preferably provided with a key scan circuit capable of detecting an input signal generated by a pressing operation through the first input section (K) such as a key button from a user, and detecting first input information on the key button on which the pressing operation is performed on the basis of the detected signal.

However, the present invention is not limited thereto, and the first input information detector 100 may be provided in various forms such as a separate driver including a key scan circuit, a key matrix, or a module.

Accordingly, the first input information detector 100 detects a scan pulse and a power voltage change of the input signal generated from the first input section (K) to recognize the key button pressed by the user.

That is, the first input information detector 100 is connected to the first input section (K) such as a key button on one side thereof and is connected to the microcontroller unit (MCU) through the serial interface 500 on the other side thereof, and thus, provides the detected first input information to the microcontroller unit (MCU) through the serial interface 500.

Further, as shown in FIGS. 1 and 2, a first input pin 100p for connection to a terminal of the first input section (K) in the form of a key button may be combined with the first input information detector 100, as necessary.

In addition, the microcontroller unit (MCU) uses the first input information provided through the first input information detector 100 as a basis for command generation of at least one of a display driving command related data signal or a buzzer driving command related data signal, on the basis of command generation reference information that is pre-stored therein.

The second input information detector 200 is connected to the second input section (R), and detects an input signal generated by an input operation through the second input section (R) from a user to detect second input information on the input signal detected by the second input section (R).

Here, the second input information detector 200 has, unlike a conventional microcontroller unit (MCU) for detecting an input signal generated from a second input section (R) such as such as a rotary knob based on a rotary encoder in a software manner, detecting information on the basis of the input signal, and storing the detected signal and the detected information, a hardware configuration separated from the microcontroller unit (MCU) and capable of independently performing the corresponding functions.

Accordingly, the second input information detector 200 is connected to the second input section (R) such as a rotary knob based on the rotary encoder on one side thereof, and is connected to the microcontroller unit (MCU) through the serial interface 500 on the other side thereof, and thus, provides the detected second input information to the microcontroller unit (MCU) through the serial interface 500.

Figure 8:
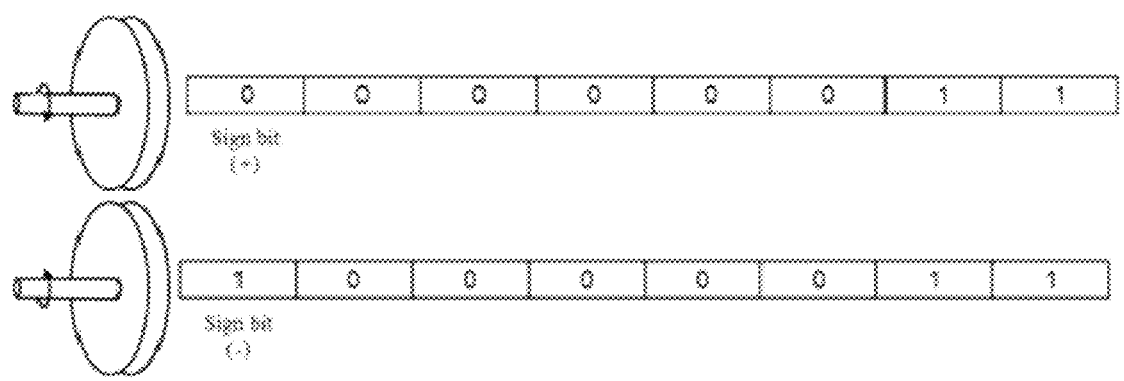
FIG. 8 is a conceptual diagram for illustrating generation of an input signal by an operation of a second input section, and a difference between generation types for operation types in the integrated circuit according to the embodiment of the present invention.

Here, as shown in FIG. 8, in the second input section R, an input signal is generated in a structure in which the most significant bit (MSB) corresponds to a direction bit indicating a rotation direction of the rotary encoder and a count area corresponding to a plurality of consecutive bits indicating information on a count value obtained by rotation of the rotary encoder in a rotation direction indicated by the most significant bit is disposed next to the most significant bit.

As shown in FIG. 8, in a case where the rotary encoder rotates in a clockwise direction, the most significant bit (MSB) of the input signal generated by the second input section (R) is displayed as '0', and in a case where the rotary encoder rotates in a counterclockwise direction, the most significant bit (MSB) of the input signal generated by the second input section (R) is displayed as '1'.

Further, '0000011' generated subsequent to the most significant bit (MSB) of the input signal generated by the second input section (R) in each rotation direction indicates information about the count value obtained by rotation of the rotary encoder in each rotation direction.

In addition, in a case where the second input information detected by the second input information detector 200 is transmitted to the microcontroller unit (MCU) through the serial interface 500, the information about the count value obtained by rotation of the rotary encoder (R) is initialized to '0'.

Thus, in a case where the second input section (R) generates a new input signal by a new input operation through the second input section (R) from the user, the information on the count value obtained by rotation of the rotary encoder (R) is calculated again from the initialized value of 0 to be displayed, and thus, it is possible to easily and correctly determine the information on the count value, and to solve a problem that a separate operating function due to overflow of information on the count values is necessary.

Further, as shown in FIGS. 1 and 2, a second input pin 200P for connection to a terminal of the second input section (R) such as a rotary knob may be combined with the second input information detector 200, as necessary.

In addition, the microcontroller unit (MCU) uses the second input information provided through the second input information detector 200 as a basis for command generation of at least one of a display driving command related data signal or a buzzer driving command related data signal, on the basis of command generation reference information that is pre-stored therein.

In this regard, the serial interface 500 refers to an entire interface for building a network for communication between the microcontroller unit (MCU), the first input information detector 100, the second input information detector 200, the first output driver 300, and the second output driver 400.

Specifically, the serial interface 500 is configured to communicate with the microcontroller unit (MCU) on the basis of the input information detected through the at least one input information detector (K, R) to receive the driving command related data signal corresponding to the input information.

Accordingly, in a case where the first input information detected through the first input driver 100 or the second input information detected through the second input information detector 200 is provided to the microcontroller unit (MCU) through the serial interface 500, as a feedback therefor, the microcontroller unit (MCU) transmits the driving command related data signal corresponding to the first input information or the second input information (the display driving command related data signal or the buzzer driving command related data signal to be described later) to the serial interface 500 to be transmitted to the first output driver 300 and the second output driver 400.

As shown in FIGS. 1 and 2, the serial interface 500 includes an Rx pin (500RP) that receives a data signal from the microcontroller unit (MCU) by forming a signal reception line (500RL) with respect to the microcontroller unit (MCU) and a Tx pin (500TP) for transmitting a data signal to the microcontroller unit (MCU) by forming a signal transmission line (500TL) with respect to the microcontroller unit (MCU).

Thus, the serial interface 500 provides a universal asynchronous receiver/transmitter (UART) communication protocol with respect to the microcontroller unit (MCU), and may be operated in a full duplex mode through the Rx pin (500RP) and the TX pin (500TP) that are separately provided, without separate software processing for communication with the microcontroller unit (MCU).

Here, first data signals (DS1, DS'1) received through the signal reception line (500RL) from the microcontroller unit (MCU) to the serial interface 500 through the Rx pin (500RP) have different packet structures according to communication protocol types between the microcontroller unit (MCU) and the serial interface 500.

Figure 4:
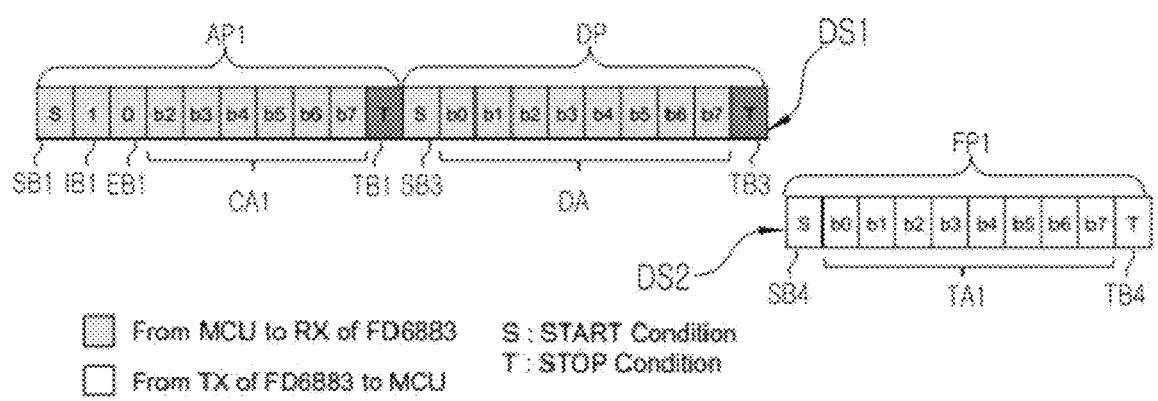
FIG. 4 is a diagram for illustrating a structure of a first data signal and a second data signal according to a write-type communication protocol between the microcontroller unit and a serial interface in the integrated circuit according to the embodiment of the present invention.

First, the first data signal DS1 according to a write-type communication protocol between the microcontroller unit (MCU) and the serial interface 500 may be configured to include a first register addressing packet (AP1) and a register data packet (DP), as shown in FIG. 4, and may be provided in a structure in which a plurality of register data packets (DP) are continuously connected to each other as necessary.

Here, as shown in FIG. 4, the first register addressing packet (AP1) has a structure in which a first start bit (SB1), a first adjacent bit (IB1), a first type indication bit (EB1), a first command area (CA1), and a first stop bit (TB1) are sequentially connected.

First, the first start bit (SB1) corresponds to a bit indicating the start of a signal as the most significant bit (MSB) of the first data signal (DS1), and the first adjacent bit (IB1) follows the first start bit (SB1) and indicates a value opposite to a value of the first start bit (SB1).

Then, the first type indication bit (EB1) follows the first adjacent bit (IB1), and indicates that the first data signal is the write-type among the read-type and the write-type, in which the first type indication bit EB1 indicates '1' in the case of the read-type and indicates '0' in the case of the write-type.

Next, the first command area (CA1) follows the first type indication bit (EB1), and corresponds to a plurality of consecutive bits indicating register address information on a target register of the first data signal among registers of the integrated circuit 100.

Finally, the first stop bit (TB1) follows the first command area (CA1), and corresponds to a bit indicating the stop of the signal.

Further, as shown in FIG. 4, the register data packet (DP) has a structure in which a third start bit SB3, a data area, and a third stop bit are sequentially connected.

First, the third start bit (SB3) follows the first stop bit (TB1) of the first register addressing packet (AP1), and corresponds to a bit indicating the start of the signal.

Next, the data area (DA) follows the third start bit (SB3), and corresponds to a plurality of consecutive bits indicating register data information to be provided to the target register. Finally, the third stop bit (TB3) follows the data area (DA), and corresponds to a bit indicating the stop of the signal.

Figure 6:
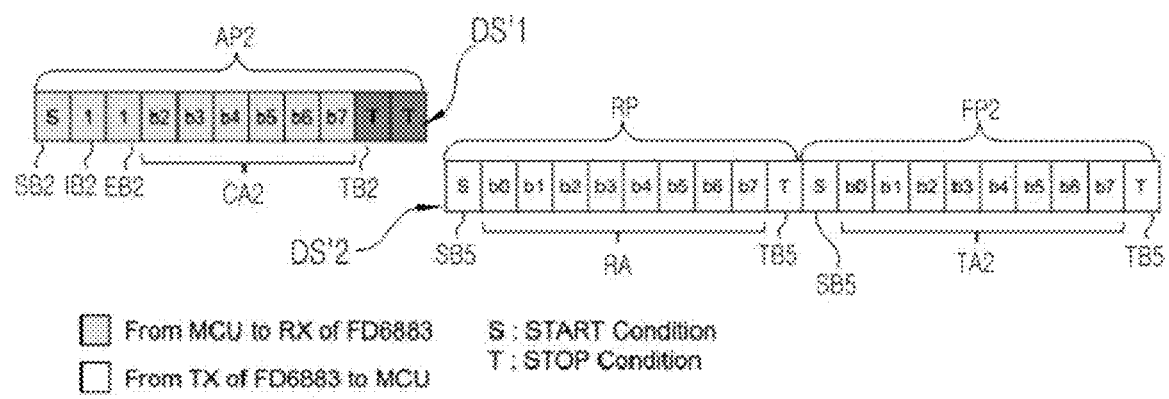
FIG. 6 is a diagram for illustrating a structure of a first data signal and a second data signal according to a read-type communication protocol between the microcontroller unit and the serial interface in the integrated circuit according to the embodiment of the present invention.

In addition, the first data signal DS'1 according to the read-type communication protocol between the microcontroller unit (MCU) and the serial interface 500 is configured to include a second register addressing packet (AP2), as shown in FIG. 6.

Here, the second register addressing packet (AP2) is configured to have a structure in which a second start bit (SB2), a second adjacent bit (IB2), a second type indication bit (EB2), a second command area (CA2), and a second stop bit (TB2) are sequentially connected, as shown in FIG. 6.

First, the second start bit (SB2) corresponds to a bit indicating the start of a signal as the most significant bit (MSB) of the first data signal DS'1, and the second adjacent bit (IB2) follows the second start bit (SB2) and indicates a value opposite to a value of the second start bit SB2.

Then, the second type indication bit (EB2) follows the second adjacent bit (IB2), and indicates that the first data signal DS'1 is the read-type among the read-type and the write type, in which the second type indication bit (EB2) indicates '1' in the case of the read-type and indicates '0' in the case of the write-type.

Next, the second command area (CA2) follows the second type indication bit (EB2), and corresponds to a plurality of consecutive bits indicating register address information on the target register of the second data signal among the registers of the integrated circuit 100.

Finally, the second stop bit (TB2) follows the second command area (CA2), and corresponds to a bit indicating the stop of the signal.

The control logic 600 controls an operation related to a baud rate of the serial interface 500 for transmitting a data signal to the microcontroller unit (MCU), and controls transmission of second data signals (DS2, DS'2) including an analysis area corresponding to a plurality of consecutive bits indicating information obtained by analyzing the bit structure of the first data signals (DS1, DS'1) received from the microcontroller unit (MCU) to the serial interface 500 through the Rx pin 500RP, to the microcontroller unit (MCU) from the serial interface 500 through the Tx pin 500TP for feedback.

To this end, the control logic 600 includes an adaptive communication rate control unit 610 and a truesum feedback control unit (620).

First, the adaptive baud rate controller 610 analyzes the baud rate of the first data signal received through the signal reception line 500RL to the serial interface 500 from the microcontroller unit (MCU) through the Rx pin 500RP.

Then, the adaptive baud rate controller 610 controls the serial interface 500 to match a baud rate of the second data signals (DS2, DS'2) transmitted through the signal transmission line 500TL to the microcontroller unit (MCU) from the serial interface 500 through the Tx pin 500TP as a response to the first data signals (DS1, DS'1) to be identical to the baud rate of the analyzed first data signals (DS1, DS'1), to thereby provide an adaptive UART serial interface.

Specifically, in a case where the adaptive baud rate controller 610 analyzes the baud rate of the first data signal (DS1) according to the write-type communication protocol between the microcontroller unit (MCU) and the serial interface 500, the adaptive baud rate controller 610 determines the baud rate of the first data signal (DS1) by analyzing a plurality of consecutive bits in the first command area (CA1) of the register addressing packet (AP1).

Alternatively, in a case where the adaptive baud rate controller 610 analyzes the baud rate of the first data signal (DS'1) according to the read-type communication protocol between the microcontroller unit (MCU) and the serial interface 500, the adaptive baud rate controller 610 determines the baud rate of the second data signal DS'2 by analyzing a plurality of consecutive bits in the second command area (CA2) of the second register addressing packet (AP2).

The analysis of the baud rates based on the command areas (CA1, CA2) in the register addressing packets (AP1, AP2) of the first data signals (DS1, DS'1) of the adaptive baud rate controller 610 may be performed by detecting edges of pulses of the consecutive plural bits forming the command areas (CA1, CA2), generating timing information based on clock information generated through the oscillator 700 that generates the clock information, calculating pulse widths of the command areas on the basis of detection results for the edges of the respective pulses, and sampling bits values of the respective pulses on the basis of the calculated pulse widths to read the respective pulse values.

Finally, the baud rate of the first data signal may be calculated on the basis of the pulse width time between adjacent bits.

Next, the truesum feedback controller 620 performs an analysis for calculating a truesum indicating the number of bits having '1' among bits in a predetermined area of the first data signals (DS1, DS'1) received through the signal reception line 500RL from the microcontroller unit (MCU) to the serial interface 500 through the Rx pin 500RP, and controls the serial interface 500 so that the second data signal including the analysis area indicating the calculated truesum result value can be fed back to the microcontroller unit (MCU).

Figure 5:
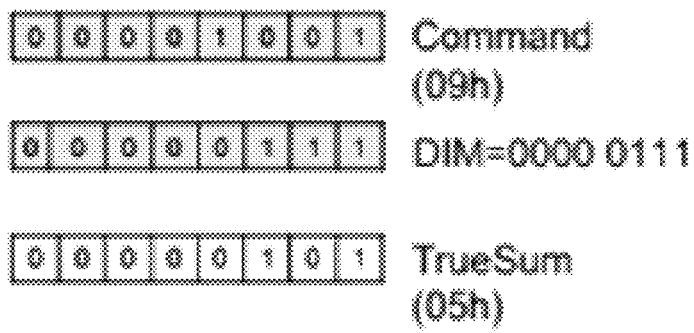
FIG. 5 is a diagram for illustrating an analysis type of a truesum feedback controller related to the second data signal according to the write-type communication protocol between microcontroller unit and the serial interface in the integrated circuit according to the embodiment of the present invention.

Specifically, as shown in FIG. 5, the truesum feedback controller 620 performs an analysis for calculating the number of bits having '1' among the plurality of consecutive bits in the first command area (CA1) of the first register addressing packet (AP1) and the data area (DA) of the register data packet (DP) as the truesum result value, for the first data signal (DS1) according to the write-type communication protocol between the microcontroller unit (MCU) and the serial interface 500.

For example, as shown in FIG. 5, in a case where the number of bits having '1' in the first command area (CA1) of the first register addressing packet (AP1) is 2 and the number of bits having '1' in the data area (DA) of the register data packet (DP) is 3, the truesum result value analyzed by the truesum feedback controller 620 is calculated as '5', and its information is reflected in the second data signal (DS2).

Accordingly, as a response to the first data signal (DS1) according to the write-type communication protocol between the microcontroller unit (MCU) and the serial interface 500, the second data signal (DS2) is provided in the form of a first feedback packet (FP1) including a fourth start bit (SB4) indicating the start of the signal, a first analysis area (TA1) that follows the fourth start bit (SB4) and corresponds to a plurality of consecutive bits indicating the information on the truesum result value calculated through the truesum feedback controller 620, and a fourth stop bit (TB4) that follows the first analysis area (TA1) and indicates the stop of the signal, as shown in FIG. 4.

Figure 7:
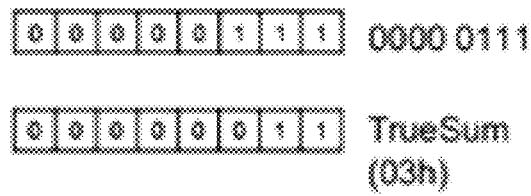
FIG. 7 is a diagram for illustrating an analysis type of the truesum feedback controller related to the second data signal according to the read-type communication protocol between the microcontroller unit and the serial interface in the integrated circuit according to the embodiment of the present invention.

Next, as shown in FIG. 7, the truesum feedback controller 620 performs an analysis for calculating the number of bits having '1' among a plurality of consecutive bits in the second command area (CA2) of the second register addressing packet (AP2) as the truesum result value, for the first data signal (DS'1) according to the read-type communication protocol between the microcontroller unit (MCU) and the serial interface 500.

For example, as shown in FIG. 7, in a case where the number of bits having '1' in the second command area (CA2) of the second register addressing packet (AP2) is 3, the truesum result value analyzed by the truesum feedback controller 620 is calculated as '3', and its information is reflected in the second data signal (DS'2).

Accordingly, as a response to the first data signal (DS'1) according to the read-type communication protocol between the microcontroller unit (MCU) and the serial interface 500, the second data signal (DS'2) includes a read data packet (RP) and a second feedback packet (FP2), as shown in FIG. 6.

Here, the read data packet (RP) is provided in the form including a fifth start bit (SB5) indicating the start of the signal, a read data area (RA) that follows the fifth start bit (SB5) and corresponds to a plurality of consecutive bits indicating read data information to be provided to the microcontroller unit (MCU), and a fifth stop bit (TB5) that follows the read data area (RA) and indicates the stop of the signal.

Further, the second feedback packet FP2 is provided in the form including a sixth start bit (SB6) that follows the fifth stop bit (TB5) of the signal of the read data packet (RP) and indicates the start of the signal, a second analysis area (TA2) that follows the sixth start bit (SB6) and corresponds to a plurality of consecutive bits indicating the information on the truesum result value calculated by the truesum feedback controller 620, and a sixth stop bit (TB6) that follows the second analysis area (TA2) and indicates the stop of the signal.

With such a truesum feedback controller 620, it is possible to maximize an error detection capability even in a noise environment, thereby achieving a normal operation as much as possible, and sufficiently securing reliability in data signal communication.

Further, the control logic 600 controls operating states of various components such as the first input information detector 100, the second input information detector 200, the first output driver 300, the second output driver 400, the serial interface 500, the oscillator 700, and the timing information generator 800, and controls movement of a variety of information, data, signals, or the like through an interconnected network.

The first output driver 300 receives the display driving command related data signal generated by the microcontroller unit (MCU) on the basis of the first input information detected by the first input information detector 100 or the second input information detected by the second input information detector 200.

In addition, the first output driver 300 is connected to the first output section (L), and controls output driving of visual information through LED emission of the first output section (L) on the basis of the received display driving command related data signal.

Here, the first output driver 300 has, unlike the conventional microcontroller unit (MCU) that processes information in a software manner and outputs visual information on a display through LED emission, a hardware configuration separated from the microcontroller unit (MCU) and capable of independently performing the display driving control function.

To this end, the first output driver 300 includes a segment driver 310, a digit driver 320, and a dimming circuit 330.

More specifically, the first output driver 300 is connected to the microcontroller unit (MCU) and the first output section (L), as shown in FIG. 2 or FIG. 3, for a series of information processing processes required in the display driving.

Here, the microcontroller unit (MCU) is connected to the first output driver 300 through the serial interface 500 to form a mobile communication network of information or signals, and is preferably connected to a display driving command related data signal receiving part (not shown) in the dimming circuit 330.

In other words, the first output driver 300 is connected to the microcontroller unit (MCU) through the serial interface 500 on one side thereof, and is connected to the first output section (L) provided as a display on the other side thereof.

First, the segment driver 310 is a configuration for a driving signal output of the display in which segment pins 310P connected to segment terminals of the first output section (L) are coupled.

Next, the digit driver 320 is a configuration for a driving signal output of the display in which digit pins 320P connected to digit terminals of the first output section (L) are coupled. In this regard, as shown in FIG. 1, it can be seen that the first output section (L) provided as a display is configured to include digits (D) for forming a digit unit to enable visual display of numbers or characters through LED emission and a plurality of segments (SE) in the digits (D) as a detailed configuration for a different display method of the digits (D).

Accordingly, respective pin structures and terminal connection forms of the segment driver 310 and the digit driver 320 in the first output driver 300 may be implemented in various embodiments, according to the configuration of the digits (D) and the segments (SE) provided for information display of the first output section (L) provided as the display.

Further, a part of the segment pins 310P coupled to the segment driver 310 may also be used as a key matrix pin for key input, and may form a matrix together with the first input pins 100P connected to the first input information detector 100 to perform an input signal reception function.

With such a configuration, the first output driver 300 can control power voltage application to the digit terminals of the first output section (L) through the digit driver 320, and can differently control selective short or open of power voltage application to the segment terminals of the first output section (L) through the segment driver 310 at the time of the power voltage application to the digit terminals of the first output section (L) through the digit driver 320, on the basis of the display driving command related data signal received from the microcontroller unit (MCU).

As a result, the first output driver 300 can output the visual information through LED emission of a form corresponding to the display driving command related data signal transmitted from the microcontroller unit (MCU) on the first output section (L).

Next, the dimming circuit 330 includes a display driving command related data signal receiving part (not shown) that receives the display driving command related data signal from the microcontroller unit (MCU), decodes the received buzzer driving command related data signal, and extracts and stores information on the display form through power voltage application for each digit and segment of the first output section (L) in the display driving command related data signal; and a display driving signal generating part (not shown) that generates a display driving signal for power voltage application for each specific digit and segment in the first output section (L) provided as the display for a specific period of time, on the basis of at least one of clock information or timing information obtained from the oscillator 700 and the timing information generator 800 together with the information on the display form through the power voltage application for each digit and segment of the first output section (L) received from the display driving command related data signal receiving part (not shown).

The display driving signal generated in this way is transmitted to each of the segment driver 310 and the digit driver 320 for individual driving output for each specific digit and segment in the first output section (L) provided as the display, as described above, so that visual information such as a specific pattern, character, or number is displayed through the LED emission.

The second output driver 400 receives the buzzer driving command related data signal generated by the microcontroller unit (MCU) on the basis of the first input information detected through the first input information detector 100 or the second input information detected through the second input information detector 200.

Further, the second output driver 400 is connected to the second output section (B), and controls output driving of auditory information through a buzzer sound of the second output section (B) on the basis of the received buzzer driving command related data signal.

Here, the second output driver 400 has, unlike the conventional microcontroller unit (MCU) that processes information in a software manner to output a buzzer sound, a hardware configuration separated from the microcontroller unit (MCU) and capable of independently performing the buzzer driving control function. For example, the second output driver 400 may be provided as a buzzer driver, but the present invention is not limited thereto.

In other words, the second output driver 400 is connected to the microcontroller unit (MCU) through the serial interface 500 on one side thereof, and is connected to the second output section (B) provided as a buzzer on the other side thereof.

The RAM 900 provides a separate storage space for recording and storing a variety of information, data, and signals that are generated or processed through a variety of components including the first input information detector 100, the second input information detector 200, the first output driver 300, the second output driver 400, the serial interface 500, the control logic 600, the oscillator 700, and the timing information generator 800 in the user input/output interface integrated circuit 1000.

The embodiments disclosed in the present invention are not intended to limit a technical scope of the present invention, and the scope of the technical ideas of the present invention is not limited by these embodiments. The scope of protection must be interpreted by the claims, and must be interpreted to include all technical ideas equivalent to the present invention.

DESCRIPTION OF REFERENCE SIGNS

1000: Integrated circuit
100: First input information detector
100P: First input pin
200: Second input information detector
200P: Second input pin
300: First output driver
310: Segment driver
310P: Segment pin
320: Digit driver
320P: Digit pin
330: Dimming circuit
400: Second output driver
500: Serial interface
500RP: Rx pin
500TP: Tx pin
500RL: Signal receiving line
500TL: Signal transmission line
600: Control logic
610: Adaptive baud rate controller
620: Truesum feedback controller
700: Oscillator
800: Timing information generator
900: RAM
950: Regulator
MCU: Microcontroller unit
K: First input section
R: Second input means
L: First output section
B: Second output section

The invention claimed is:

1. An integrated circuit with data communication stability in a noise environment that is provided in a control target device that includes at least one input section through which a signal is input from a user, at least one output section through which information is output in a predetermined form, and a microcontroller unit (MCU), independently of the microcontroller unit (MCU), and communicates with the microcontroller unit to control, on the basis of the input signal generated from the at least one input section, output driving of the output section corresponding thereto, the integrated circuit comprising:
- a serial interface that includes an Rx pin for receiving a data signal from the microcontroller unit by forming a signal reception line with respect to the microcontroller unit and a Tx pin for transmitting a data signal to the microcontroller unit by forming a signal transmission line with respect to the microcontroller unit, to provide a universal asynchronous receiver/transmitter (UART) communication protocol with respect to the microcontroller unit; and
- a control logic that controls transmission of a second data signal including an analysis area corresponding to a plurality of consecutive bits indicating information obtained by analyzing a bit structure of a first data signal received from the microcontroller unit to the serial interface through the Rx pin, to the microcontroller unit from the serial interface through the Tx pin for feedback.

2. The integrated circuit according to claim 1, wherein the control logic includes a truesum feedback controller that performs an analysis for calculating a truesum indicating the number of bits having '1' among bits in a predetermined area of the first data signal received through the signal reception line from the microcontroller unit to the serial interface through the Rx pin, and controls the serial interface so that the second data signal including the analysis area indicating the calculated truesum result value can be fed back to the microcontroller unit.

3. The integrated circuit according to claim 2, wherein the first data signal according to a write-type communication protocol between the microcontroller unit and the serial interface includes:
- a first register addressing packet that includes a first start bit indicating the start of a signal, a first adjacent bit that follows the first start bit and indicates a value opposite to a value of the first start bit, a first type indication bit that follows the first adjacent bit and indicates that the first data signal is a write-type among a read-type and the write-type, a first command area that follows the first type indication bit and corresponds to a plurality of consecutive bits indicating register address information on a target register of the first data signal among registers of the integrated circuit, and a first stop bit that follows the first command area and indicates the stop of the signal; and
- a register data packet that includes a third start bit that follows the first stop bit of the first register addressing packet and indicates the start of a signal, a data area that follows the third start bit and corresponds to a plurality of consecutive bits indicating register data information to be provided to the target register, and a third stop bit that follows the data area and indicates the stop of the signal, and
- the truesum feedback controller performs an analysis for calculating the number of bits having '1' among the plurality of consecutive bits in the first command area of the first register addressing packet and the data area of the register data packet as the truesum result value.

4. The integrated circuit according to claim 3, wherein the second data signal according to a write-type communication protocol between the microcontroller unit and the serial interface includes:
- a first feedback packet that includes a fourth start bit indicating the start of the signal, a first analysis area that follows the fourth start bit and corresponds to a plurality of consecutive bits indicating the information on the truesum result value calculated through the truesum feedback controller, and a fourth stop bit that follows the first analysis area and indicates the stop of the signal.

5. The integrated circuit according to claim 2, wherein the first data signal according to a read-type communication protocol between the microcontroller unit and the serial interface includes:
- a second register addressing packet that includes a second start bit indicating the start of a signal, a second adjacent bit that follows the second start bit and indicates a value opposite to a value of the second start bit, a second type indication bit that follows the second adjacent bit and indicates that the second data signal is a read-type among the read-type and a write-type, a second command area that follows the second type indication bit and corresponds to a plurality of consecutive bits indicating register address information on a target register of the second data signal among registers of the integrated circuit, and a second stop bit that follows the second command area and indicates the stop of the signal, and
- the truesum feedback controller performs an analysis for calculating the number of bits having '1' among the plurality of consecutive bits in the second command area of the second register addressing packet as the truesum result value.

6. The integrated circuit according to claim 5, wherein the second data signal according to a read-type communication protocol between the microcontroller unit and the serial interface includes:
- a read data packet that includes a fifth start bit indicating the start of a signal, a read data area that follows the fifth start bit and corresponds to a plurality of consecutive bits indicating read data information to be provided to the microcontroller unit, and a fifth stop bit that follows the read data area and indicates the stop of the signal; and
- a second feedback packet that includes a sixth start bit that follows the fifth stop bit of a signal of the read data packet and indicates the start of the signal, a second analysis area that follows the sixth start bit and corresponds to a plurality of consecutive bits indicating the information on the truesum result value calculated through the truesum feedback controller, and a sixth stop bit that follows the second analysis area and indicates the stop of the signal.

7. The integrated circuit according to claim 1, further comprising:
- at least one input information detector that is respectively connected to the at least one input section and detects an input signal generated by an input operation through the at least one input section from the user to detect input information on the detected input signal,
- wherein the input information detector includes:
- a first input information detector that is connected to a first input section that is provided in the control target device in the form of a key button, and detects an input signal generated by an input operation through the first input section from the user to detect first input information on the input signal detected by the first input section; and a second input information detector that is connected to a second input section that is provided in the control target device in the form of a knob connected to a rotary encoder, and detects an input signal generated by an input operation through the second input section from the user to detect second input information on the input signal detected by the second input section.

8. The integrated circuit according to claim 7,
wherein the second input section generates an input signal in a structure in which the most significant bit (MSB) corresponds to a direction bit indicating a rotation direction of the rotary encoder, and a count area corresponding to a plurality of consecutive bits indicating information on a count value obtained by rotation of the rotary encoder in the rotation direction indicated by the most significant bit is disposed next to the most significant bit, and the second input information detector detects the rotation direction of the rotary encoder and second input information on the count value on the basis of the input signal generated by the second input section.

9. The integrated circuit according to claim 8,
wherein the second input section initializes, in a case where the second input information detected through the second input information detector is transmitted to the microcontroller unit through the serial interface, the information about the count value obtained by rotation of the rotary encoder to '0'.

* * * * *